(12) United States Patent
Palaniappan

(10) Patent No.: US 7,657,498 B2
(45) Date of Patent: Feb. 2, 2010

(54) BUSINESS-ALIGNED ORGANIZATIONAL KNOWLEDGE MANAGEMENT SYSTEM, FRAMEWORK, AND TOOLS FOR CAPTURE AND DISSEMINATION OF EXPLICIT AND TACIT KNOWLEDGE OF BUSINESS OBJECTIVES AND MANAGEMENT STRATEGY ARTICULATED IN PROBLEM STATEMENTS

(75) Inventor: Nirmala Palaniappan, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 267 days.

(21) Appl. No.: 11/559,913

(22) Filed: Nov. 15, 2006

(65) Prior Publication Data

US 2008/0114715 A1 May 15, 2008

(51) Int. Cl.
*G06F 17/00* (2006.01)
(52) U.S. Cl. .......................................... 706/50; 706/61
(58) Field of Classification Search ................ 706/50
See application file for complete search history.

(56) References Cited

U.S. PATENT DOCUMENTS

2002/0169737 A1* 11/2002 Armstrong et al. ............ 706/59

OTHER PUBLICATIONS

Ramalingam, Tools for Knowledge and Learning: A Guide for Development and Humanitarian Organisations, Jul. 2006.*

* cited by examiner

*Primary Examiner*—David R Vincent
*Assistant Examiner*—Nathan H Brown, Jr.
(74) *Attorney, Agent, or Firm*—Prakash Nama; Global IP Services, PLLC

(57) ABSTRACT

A business-aligned knowledge management system and method for creating the same are disclosed. In accordance with a first aspect of the invention, a knowledge management system includes a knowledge management (KM) framework providing aspects of a knowledge-focused approach to business management; a KM implementation guide having steps for establishing a business-aligned knowledge management system within the KM framework; and a KM execution toolkit having tools for used with the KM implementation guide.

24 Claims, 6 Drawing Sheets

| | Identify | Define | Execute | Assess | Sustain |
|---|---|---|---|---|---|
| Obj | - Confirm/review KM vision<br>- Identify/confirm business challenges | - Define KM strategy<br>- Technology roadmap<br>- Roll-out plan | Implement KM plan either as a pilot or across enterprise | Monitor KM implementation & evaluate performance of system | Embed enhancements in business processes, replicate projects |
| Inputs | - Business vision & strategy<br>- Existing KM scenario<br>- Current tech landscape<br>- Industry best practices, benchmarks | - KM vision<br>- High-level problem statements | - KM vision<br>- Strategy<br>- Detailed plan<br>- Technology roadmap | - KM plan<br>- Stakeholder feedback<br>- Checklists | - Outputs of all previous phases |
| Activities | - Assess & consolidate current KM strategy<br>- Stakeholder identification<br>- Conduct workshops<br>- Articulate problem statements<br>- Verify, prioritize & select<br>- Study tech landscape + IS transformation<br>- Gap analysis | - Conduct workshops<br>- Detail-out problem statements<br>- Technology evaluation<br>- Conduct POCs, if required<br>- High-level planning exercises for delivery (low-hanging fruit) | - Design KM system (metadata, taxonomy, etc.)<br>- Technical design<br>- Implement pilot system<br>- Test and roll-out pilot | - Measure benefits<br>- Qualitative reviews<br>- Plan v/s actual comparison<br>- Identify course corrections | - Replicate pilot projects<br>- Consider extended requirements<br>- Plan to track & improve benefits<br>- Consolidates & document learnings |
| Outputs | - Analysis report<br>- High-level problem statements<br>- KM vision<br>- Checkpoint workshop | - KM strategy*<br>- Roll-out plan<br>- Technology recommendation | - KM plan checklist<br>- Working KM system<br>- User guidelines<br>- Roles & responsibilities | - Observations, filled-in checklists<br>- Analysis & findings<br>- Measures-survey results | - Policy doc changes<br>- Procedure changes<br>- Checklists templates, guidelines |
| Stakeholders | - KM champions<br>- Business unit champions<br>- Pilot IS/ Business rep.<br>- IS strategy/ infrastructure | - Business unit champions<br>- End users<br>- IS strategy/ infrastructure | - End users<br>- IS strategy/ infrastructure | - KM champions<br>- BU champions<br>- End users<br>- IS Strategy/ infrast. | - KM champions<br>- BU champions<br>- End users<br>- IS Strategy/ infrast |
| Reference | Checklists  ToolKits  Models  Best Practices  Frameworks  Technology Landscape  Guidelines  Templates  Roadmaps | | | | |

Fig. 3B   * Communication guidelines, procedures, practices, implementation toolkits, ideas & guidelines, roles & responsibilities, metrics

BUSINESS-ALIGNED ORGANIZATIONAL KNOWLEDGE MANAGEMENT SYSTEM, FRAMEWORK, AND TOOLS FOR CAPTURE AND DISSEMINATION OF EXPLICIT AND TACIT KNOWLEDGE OF BUSINESS OBJECTIVES AND MANAGEMENT STRATEGY ARTICULATED IN PROBLEM STATEMENTS

FIELD OF INVENTION

The present invention relates to the field of information management. More specifically, the present invention relates to a business-aligned knowledge management system and method for creating the same.

BACKGROUND OF INVENTION

Knowledge management is a term generally associated with capturing, organizing, maintaining, and disseminating information and knowledge, typically, within a business organization. In general, a knowledge management (KM) system specifies practices, tools and processes for managing knowledge. However, in most cases, existing KM systems are detached from the business operations of the organization. The KM systems are more concerned with the mechanics and processes of knowledge management and thereby creating a form of knowledge repository system that the businesses within the organization tap upon from time to time. There seems to be a lack of close relationship between existing business needs and the KM systems within the organizations. The KM systems do not address how the accumulated knowledge can be used to facilitate business management to help the businesses.

Therefore, there is a need to provide a business-aligned KM system that is intricately linked to the business needs and a method for creating the same.

SUMMARY

A business-aligned knowledge management system and method for creating the same are disclosed. In accordance with a first aspect of the invention, a knowledge management system includes a knowledge management (KM) framework providing aspects of a knowledge-focused approach to business management; a KM implementation guide having steps for establishing a business-aligned knowledge management system within the KM framework; and a KM execution toolkit having tools for used with the KM implementation guide.

In accordance with a second aspect of the invention, a method of creating a business-aligned knowledge management system includes providing a knowledge management (KM) framework specifying aspects of a knowledge-focused approach to business management; using a KM implementation guide having steps for establishing the business-aligned knowledge management system; and providing a KM execution toolkit having tools for use with the KM implementation guide.

In accordance with a third aspect of the invention, an apparatus for facilitating the creation of a business-aligned knowledge management system is disclosed.

BRIEF DESCRIPTION OF DRAWINGS

Embodiments of the invention are herein described, purely by way of example, with references made to the accompanying drawings, in which:

FIG. 3B shows a summary of inputs and outputs of each step of the KM implementation guide of FIG. 3A;

DETAILED DESCRIPTION

Figure 1:
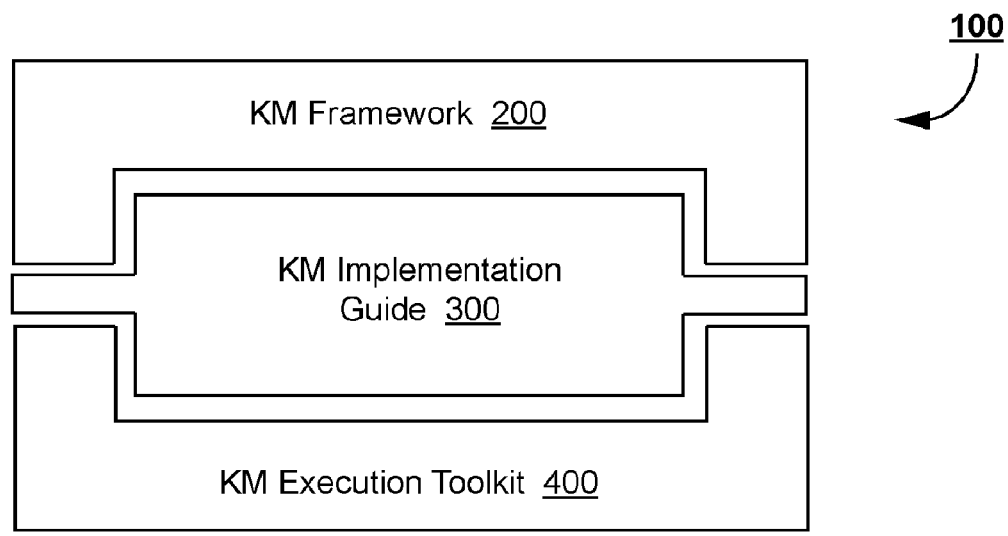
FIG. 1 shows an overview block diagram of a knowledge management (KM) system according to the present invention.

An overview block diagram of a knowledge management (KM) system 100 for establishing a business-aligned knowledge management system is shown in FIG. 1. The KM system 100 includes a business-aligned KM framework 200, a KM implementation guide 300, and a KM execution toolkit 400 to facilitate the process of capturing and sharing knowledge that help to address business challenges. The business-aligned KM framework 200 (hereinafter also referred to as "the framework") provides an environment that leads to a knowledge-focused approach to business management where business objectives are closely linked to knowledge management functions. In this regard, the business-aligned KM system established according to embodiments herein is not a stand-alone system that contains an inventory of knowledge (like a library), but one that is closely linked to and seeks to address real business needs of the organization.

Figure 2:
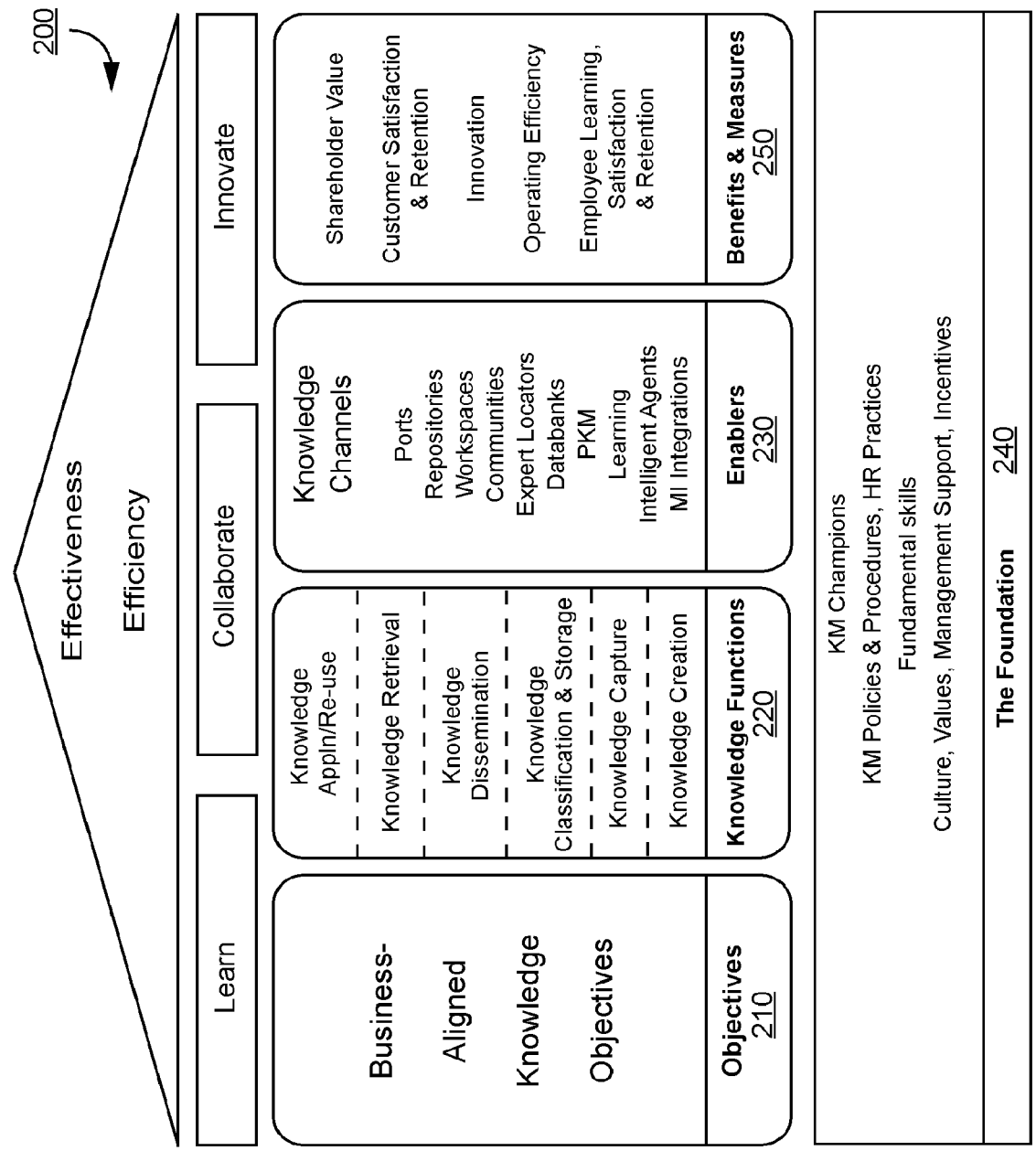
FIG. 2 shows different aspects of the business-aligned knowledge management framework of the KM system of FIG. 1.

FIG. 2 shows different aspects of the framework 200. Business objectives of the organization are translated into a set of business processes that deliver desired results. Invariably, some of these business processes are knowledge intensive and thus typically involve the management of knowledge. Since this knowledge is linked to the business processes, it has specific purposes and is identified as business-aligned knowledge objectives 210, a building block of the framework 200.

The framework 200 also includes a knowledge functions block 220 that specifies a knowledge life cycle. The knowledge life cycle includes knowledge generation, knowledge capturing, knowledge classification and storage, knowledge dissemination, knowledge retrieval, and knowledge application and re-use. These stages in the knowledge life cycle require enablers that facilitate tasks in each stage of the cycle. Accordingly, an enablers block 230 is provided in the framework 200. The enablers include both technical and systemic enablers that can be operated and sustained by the organization. The technical enablers are knowledge channels such as portals, repositories, workspaces, communities, experts locators, databanks, Personal Knowledge Management (PKM), after-action review (AAR), learning systems that capture modules of information and knowledge on a given subject with automated mechanisms that help employees to self learn and assess topics with or without supervision, intelligent agents, Management Information Systems (MIS) integration, and the like information technology solutions. The systemic enablers can include Enterprise Resource Planning, Customer Relationship Management Systems, Previously Existing Systems that are well-defined in order to facilitate a business process.

Also included in the framework 200 is a foundation block 240 that specifies the fundamental aspects of an organization in order to ensure the successful deployment and operation of the business-aligned KM system. Enabling fundamentals are characterized by having clear values, a KM embracing culture involving rank and file employees as well as management at all levels; and people-practices (e.g. HR policies, practices and knowledge-sharing/collaboration-related Incentives) that encourage and promote knowledge management (e.g. communication, sharing, mentoring, recording and/or documenting, listening skills, and knowledge transfer activities) and have appropriate management supports in place. The fundamentals in the foundation block 240 also include having KM policies and procedures clearly articulated and KM champions who lead and hold the various KM related activities together.

Further, the framework 200 includes a benefits and measures block 250 that specifies outcomes to be expected as a result of successfully deploying the business-aligned KM system. These outcomes can take the form of improved employee learning, job satisfaction, and retention, improved operational efficiency and production, regular innovations, customer satisfaction and retention, and increased value to shareholders. The benefits and measures block 250 provides parameters to be measured pre and post KM implementation to prove the tangible benefits of the business-aligned KM system. The ultimate results are improved efficiency and effectiveness of the organization where it spends most, if not all, of the time doing things right and doing the right things. An organization that is knowledge management enabled is characterized by its thirst and reputation for learning, collaborating, and innovating activities.

Figure 3A:
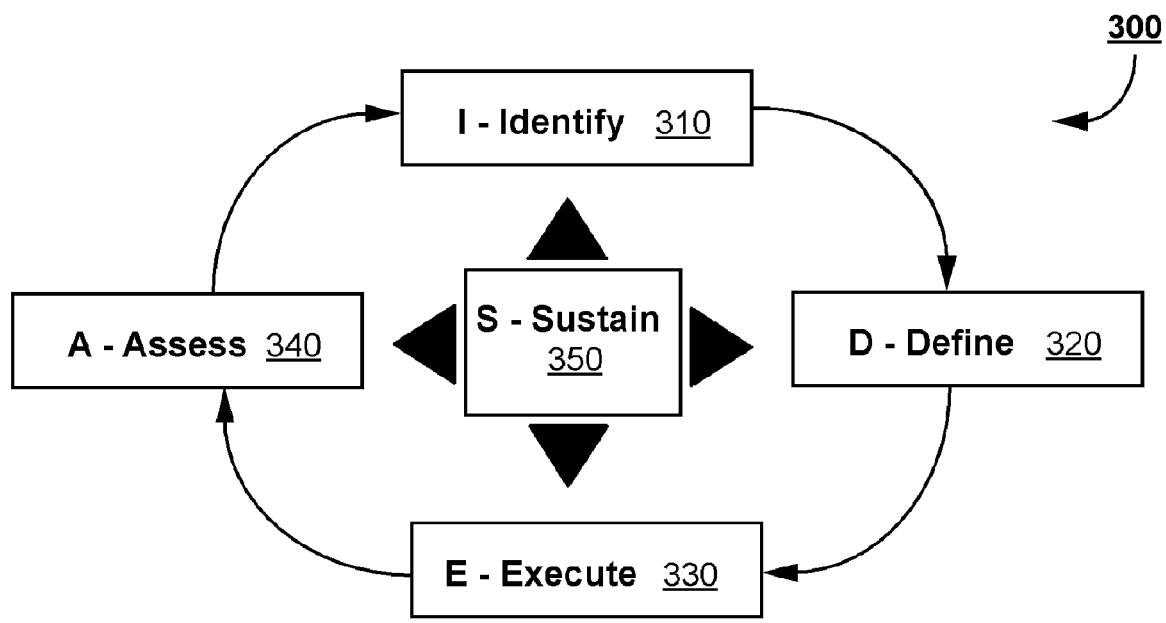
FIG. 3A shows a flow diagram of the knowledge management implementation guide of the KM system of FIG. 1.

FIG. 3A shows a flow diagram of the KM implementation guide 300 of the KM system 100. The KM implementation guide 300 includes five steps, namely, Identify 310, Define 320, Execute 330, Assess 340 and Sustain 350. The first letters of the five steps form an appealing acronym IDEAS that serves as an easy to remember indicator for processing through the implementation steps.

I—Identify

The Identify step 310 is to clearly identify business objectives of a business unit or division or the entire organization whichever the case may be. Identifying the business objectives can take place through meetings, discussions, brainstorming sessions and surveys. In particular, this step 310 involves performing a detailed analysis of the organization's knowledge, needs, customer expectations, perceived gaps, business process bottlenecks, cultural barriers, system deficiencies, and the intricacies of knowledge flow through the various business systems. The outcome of this analysis is to provide stakeholders with a list of areas to be addressed by the business-aligned KM system. In an embodiment, the areas of concerns, needs or problems in the list are arranged according to a priority, from which the top one to three needs (depending on the scale and complexity of the specific needs) are selected for implementation. Thus, in this step 310, the following inputs and outputs can be expected:

(1) Inputs:
Inputs from stakeholders obtained through interviews, workshops, brainstorming sessions, discussions, surveys, existing process documents and flowcharts, forms and templates;
Current business vision and strategies;
Existing KM vision and strategies, if any;
Best practices and benchmarks; and using the business-aligned KM framework 200 as a directional and guiding tool. The framework 200 brings to attention business objectives need to be considered for the purpose of setting KM objectives. It also points out the foundational aspects need to be in place. It helps the user of the framework 200 to take into consideration the knowledge-intensive processes and the potential benefits and measures. The framework 200 gives the user a holistic perspective in establishing the KM objectives.

(2) Outputs:
Analysis and interpretation of current business situations; and
A list of prioritized needs or problem statements and implications.

D—Define

The Define step 320 involves selecting the top one to three problems in the list provided by the Identify step 310 and comprehensively defining parameters for knowledge management projects to address the selected problems and specify desired end results to the selected problems. Accordingly, the current business situation is defined in terms of parameters, whereby each of the parameters can be quantitatively measured or assigned a qualitative value or a combination thereof. Following on from this, improvements against the measures for each of the parameters are specified for the to-be business situation. For example, if a parameter of a current business situation is quantitatively assigned, for instance, losing market share at a rate of 5% per quarter, improving the measurement for this parameter by 50% (i.e. reduce lost of market share to 2.5% per quarter) or improve customer satisfaction ratings from 5 out of 10 to 7 out of 10 can be considered an acceptable improvement for the business in focus.

Once the parameters of the current business situation and their measurements are defined and acceptable improvements in the measurements of the parameters for the to-be business situation are determined, a detailed knowledge management strategy based on the defined business situation is formulated. The detailed knowledge management strategy includes a well-documented version of the vision, processes, expectations, roles, and timelines (i.e. articulate KM vision and plan). The determination of what constitutes one or more KM projects needs to be decided by KM consultants in co-ordination with the senior management of the organization. The KM consultants typically provide examples and case studies of what could be a typical KM project and also enquire about the current business challenges that lead to the easy identification of the one or more KM projects. The number of KM projects depends on the complexity of the business challenges. The stakeholders are then identified at the micro level after which the detailed plan is written up. Thus, in this step 320, the following outputs can be expected:

(3) Outputs:
A detailed version of the problems statements (detailing parameters, people, processes and tools involved in the KM projects) leading to statements of objectives (or vision) for the one or more KM projects; and
A KM vision and plan document including details of KM strategies such as phased out plan (i.e. a KM execution plan that is broken into smaller pieces that make it easy to manage) with schedules and requirements; and answers to the WHAT, WHY, WHEN, WHO, and HOW questions.

E—Execute

The Execute step 330 involves detailed exploration of the business problems and the actual application of relevant aspects of the KM execution toolkit 400 (hereinafter also referred to as the "toolkit") and best practices to achieve the desired end results specified in the Define step 320 for selected business problems. Activities performed in this step 330 also make reference to the framework 200. How extensive the different aspects of the toolkit 400 and framework 200 are referred to largely depends on the identified problems being focused on. For example, if an identified problem is the process of bringing new employees up-to-speed (on-board) and the parameters and measures defined for the problem is the time taken for a new employee to start contributing to the assigned project, the money spent on training the new employee (direct and indirect costs like time spent by seniors in mentoring the new employee, etc.), the knowledge creation and utilization and learning system aspects of the framework 200 are referred to through out the execution stage.

Execution of the KM project(s) defined in the Define step 320 is typically carried out on a pilot basis in a business unit in consultation and collaboration with the stakeholders identified at the start of the KM project(s). In executing a KM project, three aspects are considered, namely, people, process and technology. The gap between the current business situation and the to-be business situation determines the use of people processes and practices. For example, incentive schemes for contributors to the KM objectives, performance appraisal based on knowledge sharing activities, mentoring practices, knowledge sharing tendency as a fundamental quality in employees recruited, etc. It also determines how to improve existing business processes or implement new business processes from a knowledge management perspective and using appropriate knowledge management tools (as described hereinafter with reference to FIG. 4) accompanied by technical enablers as described in the foregoing with reference to FIG. 2.

The execution step 330 also involves categorizing the business problems according to the types of knowledge the problems associate with. Knowledge can be of the explicit type or tacit type as explained in more details hereinafter with reference to FIG. 4. Once the type of knowledge associated with the business problems is ascertained, appropriate KM tools and technical enablers can be applied. Thus, in this step 330, the following outputs can be expected:

(4) Outputs:
- A knowledge management checklist, for example, for identifying the knowledge generated, captured and utilized in a given process.
- Roles and Responsibilities document which may involve modification of existing responsibilities for a given role or the introduction of new roles like knowledge artifact reviewers, knowledge artifact creators, etc.
- User guidelines, demonstration and orientation. In case the KM projects result in the creation of new systems, processes, etc. it would involve creation of guidelines for using the new systems and following the new processes. The orientation of employees towards this new systems and processes may involve additional sessions conducted across the organization, communiqués to promote them and so on.
- A pilot business-aligned KM system. The functioning of this system depends completely on the objectives set for the KM project. For example, a business-aligned KM system developed for the purpose of improving the time taken to bring new employees up to speed may look like a portal with training modules, articles, presentations, e-books, etc. It may additionally have embedded workflow that takes a new employee through a pre-defined set of material based on the profile of the new employee as captured by the system. The system may then pose a set of randomly chosen questions from a questions database and then declare the performance of the new employee in comparison to average performances and communicate the same to a mentor of the new employee. The mentor may then take actions based on the performance of the new employee. The entire process may take less time than if it were manually conducted and there may be components of the system (based on KM fundamentals) that allows the new employee to discuss and exchange thoughts with seniors as well as colleagues in order to learn more.

Upon establishing the pilot KM project that leads to the pilot business-aligned KM system and it is shown to have achieved the desired end results, the experience gained can be leveraged by applying the KM project to other business units. Typically, the extension to other business units is initiated in the Sustain step 350.

A—Assess

The Assess step 340 is concerned with evaluating the performance of the pilot KM project against the desired end results established in the Define step 320. In an embodiment, the post-implementation situation (i.e. the to-be situation) is assessed after a certain time has lapsed (settling time). The settling time is determined by the stakeholders of the KM project and it typically should be long enough for the KM project to have an effect on the business management and able to provide meaningful results.

This Assess step 340 involves detailed assessment of the new system including the processes of the pilot KM project. Business performance and qualitative inputs from concerned stakeholders for which the km project is related to are obtained and assessed through quantitative measurements as well as qualitative surveys as specified in a document in the Define step 320. The Assess step 340 also includes feedback collection and course corrections in the pilot KM project implementation or business objectives or both, if any. The pilot KM project, which may be a sub-system or the entire system of the business-aligned km system, is observed over a defined period of time and this step 320 is considered completed once the pilot KM project is found to have achieved the desired end results. In the event that the pilot KM project is found to be inadequate to achieve the desired end results, the pilot KM project is abandoned and re-designed starting again from the Identify step 310.

Effectively, the activities in the Assess step 340 is primarily concerned with measuring, reviewing and improving the business-aligned KM system established through the pilot KM project. Thus, in this step 340, the following outputs can be expected:

(5) Outputs
- A filled-in knowledge management checklist;
- Assessment write-up on the performance of the pilot KM project;
- Measurements and calculations based on the differences in the identified quantitative parameters; and
- Survey results and ratings on the identified qualitative parameters, if applicable.

S—Sustain

The Sustain step 350 involves monitoring, maintaining and enhancing the established business-aligned KM system. The identified parameters and their measurements are observed and tracked for the purpose of improving and evolving the business-aligned KM system so that it stays relevant to the changing business requirements. In addition, improvements to the business-aligned KM system can also be contributed through introducing appropriate cultural orientation into the business processes. Example of such orientation can include storytelling that brings out the benefits of the KM-related enhancements, work performed by KM champions at senior levels to motivate and inspire employees, making use of suitable automating tools that are created post system implementation. For example, in the case of a learning system, a tool may be developed to capture the metrics related to the performance of new employees and carry out analysis that brings out the gradual improvement in the process. Further, the learning system may include a new practice in the form of recorded expert interviews to facilitate learning experience. Other tools can include experts locators, personal knowledge management (PKM) and after-action review (AAR), This step 350 also includes replicating and extrapolating the success of the pilot KM project to other business units throughout the organization. Thus, the following outputs can be expected:

(6) Outputs

Policy documents, for example, on learning and performance of a new employee may be mandated prior to assigning a project.

Procedure documents, for example, on learning system procedure may involve a mentor-mentee relationship, steps to be taken by the mentor in case of different scenarios related to the performance of the new employee.

Checklists, for example, for the KM system in order to sustain it. The checklist can include the requirement for the KM champion to check that the latest articles/knowledge have been uploaded into the learning system every month.

Templates associated with the objectives. For example, in the case of the learning system, the template may be related to expert interview documentation, etc.

User guidelines, demonstration and orientation relating to training or introduction to the overall KM policy/procedures.

Roles and responsibilities document; and

Replicating the success of the pilot project to other business units.

The KM implementation guide 300 shows that the Sustain step 350 points to all other 4 steps. This is indicative that the Sustain step 350 has an impact on all other steps as the entire cycle may have to be revisited to enlarge the scope, include more people/departments, etc. The various aspects under each of the fives step described in the foregoing can be summarized as shown in FIG. 3B.

Figure 4:
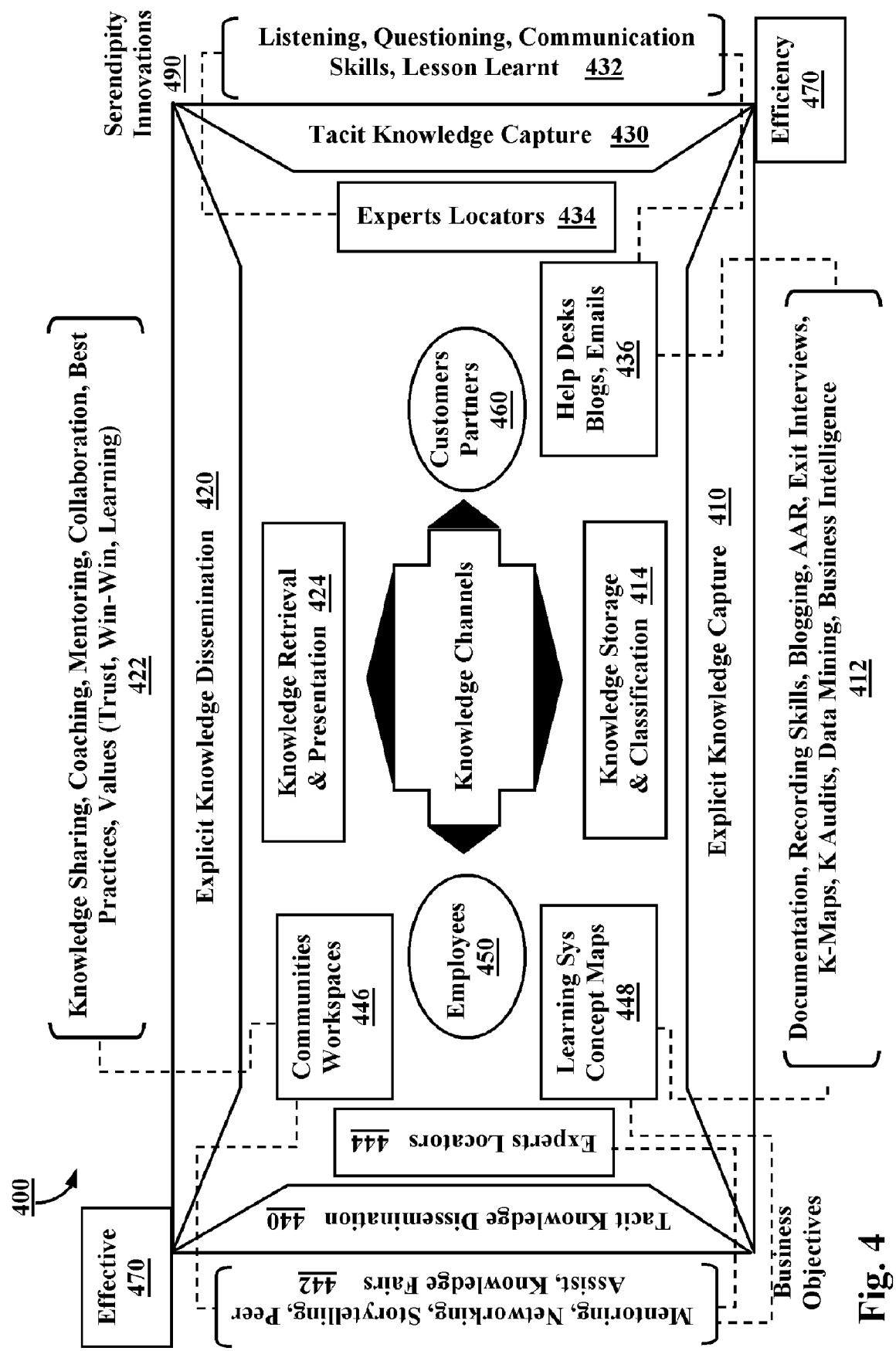
FIG. 4 shows different aspects of the knowledge management execution toolkit of the KM system of FIG. 1.

A block diagram showing different aspects of the KM execution toolkit 400, in accordance with an embodiment, for facilitating the implementation of the business-aligned KM system according to the KM implementation guide 300 and within the KM framework 200 is shown in FIG. 4. The KM execution toolkit 400 (hereinafter also referred to as "the toolkit") provides a collection of known best KM practices and tools based on business objectives and challenges. Some examples of the known best KM practices and tools include sharing, mentoring, lessons learned documentation, storytelling, blogging and experts locators.

The toolkit 400 also provides reasons as to why a business-aligned KM system is required, roles of the (enablers) knowledge channels (426, 434, 436, 444, 446 and 448) and core KM processes (412, 422, 432 and 442). The toolkit 400 also indicates stakeholders (450 and 460) of the business-aligned KM system as well as the benefits (470, 480 and 490) the business-aligned KM system brings to the organization. The toolkit 400 can be regarded as a culminating point providing an overview of the processes, techniques, practices and tools of KM; and a guide for the appropriate selection of the processes, techniques, practices and tools according to the requirements, problems or challenges of a business unit.

Further, the toolkit 400 facilitates the process of capturing and sharing knowledge relevant to resolving business challenges. In particular, the toolkit 400 is concerned with four aspects of dealing with such knowledge: (a) explicit knowledge capture 410, (b) explicit knowledge dissemination 420, (c) tacit knowledge capture 430, and (d) tacit knowledge dissemination 440. Associating these four aspects of the toolkit 400 with relevant business challenges provides clarity and understanding towards establishing a KM system that is business-aligned.

(a) Explicit Knowledge Capture 410

Key questions that a business may have and can be answered by capturing explicit knowledge include:

Do we know what we know?

Are our business management practices, structures, processes and systems well-known and easily accessible?

Do we look to the past and capture the learning experiences?

Do we know who is who in the organization, i.e. experts and key people in the organization?

Are we able to recognize patterns in our business?

Do new employees get onboard quickly?

Does our workflow take into consideration the knowledge needed to execute the concerned task/activity relating to the business operations?

Do we have processes and tools to manage our knowledge artifacts, i.e. articles, plans, procedures, checklists, templates, reports, review comments, models, intellectual property, etc. on a continuous basis?

These questions typically deal with business situations that require focus on the processes of capturing explicit knowledge and technologies needed to facilitate explicit knowledge capturing in order to ensure that the right people have access to the right knowledge. The capturing process can include activities such as documentation, recording skills, exit interviews, knowledge maps that indicate where knowledge can be found (i.e. knowledge sources), knowledge audits (i.e. the process of identifying what knowledge is needed for the business to function, and what actually exists and the gap between the two), data mining, business intelligence gathering, after-action review, blogging, and the like (412). Associating with these activities are technologies to facilitate knowledge classification and storage 414. In an embodiment, the captured explicit knowledge is classified and stored according to business objectives.

(b) Explicit Knowledge Dissemination 420

Key questions that a business may have and can be answered by disseminating explicit knowledge include:

Do our business or operations related systems work together? Are they integrated?

Do we find ourselves re-inventing the wheel?

Do we use the knowledge we captured? Do we leverage on technology to retrieve and access knowledge?

Does the organization get together and learn? Does the organization exhibit sharing and collaborating characteristics?

Are there sharing mechanisms in all our knowledge-intensive processes?

Does the workflow take into consideration knowledge requirements?

How easy is it to find and utilize information?

Is there consistency in the performance of functions (e.g. finance, HR, administration, logistics) in business units across the organization?

These questions typically deal with business situations that require focus on people within the organization and technologies for enabling explicit knowledge dissemination. Issues relating to people include processes and best practices in knowledge sharing, coaching, collaboration, best business, operational and performance practices and values 422 (e.g. trust, learning and win-win). Technologies associating with the dissemination process include those relating to knowledge retrieval and presentation 424 and information portals and searches 426.

(c) Tacit Knowledge Capture 430

Key questions that a business may have and can be answered by capturing tacit knowledge include:

Do our people policies and practices emphasize learning, sharing and teaching?

Does the organization take time to pause, reflect and learn?

Is it easy to find and access people (i.e. experts)?

Does the organization have listening and questioning habits embedded in its culture?

Is retiring workforce a serious problem?

Does the organization operate primarily in the areas of consulting and knowledge-intensive services?

These questions typically deal with business situations that require focuses on processes and people. In this instance, the processes include capturing tacit knowledge through listening, questioning, lessons learnt 432 and other communication means such as blogging, emails, and help desks 436. Issues relating to people include locating experts, succession planning, problem resolution through mentoring and community-discussions, etc.

(d) Tacit Knowledge Dissemination 440

Key questions that a business may have and can be answered by disseminating tacit information include:

Does the organizational culture emphasize on trust, win-win approach, excellence and innovation through collaboration?

Are like-minded people or people with similar interests able to locate and work with each other?

How fast is the organization learning?

Do people allocate time for mentoring, reflecting and learning together?

Do people know who they need in order to help address knowledge deficiency?

Are the roles of employees and organization defined based on knowledge requirements?

Is succession planning knowledge-focused?

Does the organization understand its knowledge requirements to a significant level of detail?

Is explicit knowledge captured under utilized?

These questions typically deal with business situations that require focus on processes and people. In this instance, the processes are concerned with mentoring, networking, storytelling, peer assist and knowledge fairs 442. Issues relating to people include locating experts, communities, knowledge sharing, etc.

The KM system 100 is further described hereinafter by way of an example. In this example, an organization dealing with leading edge technology is growing rapidly with many new employees being hired due to high growth. At the same time, there are a few senior employees leaving the organization. Clearly, the organization needs the new employees to handle new business opportunities and convert the business opportunities into success in terms of the bottom-line as well as customer satisfaction and relationships. In this example, the organization is clearly presented with, among others, the following challenges:

1. Leveraging past experience to do well in the upcoming opportunities.
2. Training and coaching the new employees to help them get on-board quickly.
3. Embedding knowledge in the business systems and business processes of the organization and making it a sustainable culture.
4. Making the knowledge of who is an expert in what and the knowledge processes and practices of the organization known to all employees in order to assist the new employees in their efforts to come on-board quickly.

Keeping in mind the framework 200, the steps in the KM implementation guide 300 help to identify, define, execute, assess and sustain a business-aligned KM system that specifically addresses the four organizational challenges articulated as above. Accordingly, in this example, the business objective is concerned with the reduction of time and costs associated with the on-boarding process of new employees and thus the improvement of the efficiency of the related processes.

The first step, Identify, is to understand the intensity of the challenges, accurately identify the needs surrounding the business situation (challenges faced by the organization) and thereafter build a business case. In this step, a clear link is drawn between the business situation and the role of knowledge management system. Statements pronouncing clearly that solutions to the business challenges involve targeted (business-aligned) management of knowledge are drawn up and made known to all stakeholders, for instance, a department that recruits many people, recruitment team, training department and concerned managers].

Making use of the execution toolkit 400 (i.e. relate to the queries that are identified and the corresponding practices, tools and techniques), key business questions relating to the business challenges are raised in order to clearly identify KM objectives. These questions include:

Do we know what we know?

Are our business practices, structure, processes and systems well known to all employees and easily accessible?

Do we look to the past and capture the learning experiences?

Do we know who is who?

Do new employees get on-board quickly?

Does our workflow consider knowledge needs?

Does our workflow take into consideration knowledge requirements?

Do we have processes and tools to manage our knowledge artifacts on a continuous basis?

Does the organization get together and learn? Does the organization exhibit sharing and collaborating characteristics?

Are there sharing mechanisms in all our knowledge-intensive processes?

How easy is it to find and utilize information?

Do our people policies and practices emphasize learning, sharing and teaching?

How fast is the organization learning?

Do people allocate time for mentoring, reflecting and learning together?

Are the roles of Employees and Organization defined based on knowledge requirements?

Is succession planning knowledge-focused?

In this example, it is apparent that the organization needs to make use of its past experience and expertise residing in the heads of senior employees. The organization needs to leverage on existing knowledge to train new employees to take advantage of new business opportunities and provide systems and processes that enable new employees access expertise and knowledge.

Accordingly, business systems and processes need to be established in order to harness and re-use the knowledge. The questions raised in the foregoing lead to the identification of the following exemplary key business processes which are knowledge-intensive and relevant to address the business objective: (a) Induction Process; (b) Project Planning Process; (c) Project Closure Process; and (d) Training Process.

The second step, Define, is to lay a foundation for creating the business-aligned KM system. This step involves defining the opportunities for achieving the business objective of reducing time and costs associated with the process of bringing new employees on-boarding and thus improving the efficiency of the related processes. This also includes identifying the measurements, which are subsequently used to gauge the success of the business-aligned KM system in the Assess step. In this second step, the framework 200 is referred to as a directional tool to help define the parameters. To help define the parameters, questions raised in the first step are answered:

Do we know what we know?
A. Partly. But we need to document what we have learnt in the form of instructional papers, business practices, best practices, lessons learnt, procedures, checklists, and so on.

Are our business practices, structure, processes and systems well known to all employees and easily accessible?
A. Partly. We need to put together a parental system that links all business practices, processes and sub systems and put in place a governance process for the parental system. We need to have an intranet that makes the parental system and information therein easily accessible.

Do we look to the past and capture the learning experiences?
A. No. We need to develop a template that can be used to capture our past learnings and store the information for easy reference by employees within the organization.

Do we know who is who?
A. No. We need to have an expert locator and employee profiler that can be accessed by employees within the organization.

Do new employees get on-board quickly?
A. Partly. The on-boarding process is highly people-dependent and we need to automate this process as much as possible. Automating this process also enables new employees to learn on their own before being attached to seniors who will then mentor them.

Does our workflow take into consideration knowledge requirements?
A. Partly. We need to map our on-boarding processes to knowledge requirements, both in terms of captured explicit knowledge and tacit knowledge (e.g. knowledge gained by experienced senior employees). We need to embed knowledge in our on-boarding processes by capturing the knowledge at the time of creation and disseminating the same at the time it is required.

Do we have processes and tools to manage our knowledge artifacts on a continuous basis?
A. Partly. We may need to introduce new processes to manage our knowledge. We may need to develop tools and mechanisms to better manage our explicit and tacit knowledge or perhaps even invest in ready-to-use products that meet our knowledge management requirements.

Does the organization get together and learn? Does the organization exhibit sharing and collaborating characteristics?
A. Perhaps not as much as we would like to see. We may need to build communities and introduce a culture of learning and sharing.

Are there sharing mechanisms in all our knowledge-intensive processes?
A. No. We must identify some of our knowledge-intensive processes and build tools that help people capture what they learnt and share the knowledge with people who they know might need the knowledge or use the tools to automatically route the knowledge to people who are in need.

How easy is it to find and utilize information?
A. Not as easy as we would like it to be, as shown by a recent survey. We need to provide a technology enabler that is intuitive and user friendly to facilitate and encourage information searching and utilization.

Do our people policies and practices emphasize learning, sharing and teaching?
A. Maybe not. We need to work on the culture to bring out the importance of these activities by using appropriate communications, associated promotions, encouragements, motivations, and incentives.

How fast is the organization learning?
A. We are making the same mistakes at times. We need to ensure that best practices and learnings are transferred quickly and continuously. This is achieved by defining processes that help capture knowledge at the time at which it is generated and using appropriate tools (e.g. recorders, blogging, etc.) for the purpose and developing universally accessible portals.

Do people allocate time for mentoring, reflecting and learning together?
A. No. We need to bring in this culture and make appropriate changes to our HR policies and practices to allow and support employees to taking time off for these activities.

Are the roles of the employees and organizational defined based on knowledge requirements?
A. Yes. Our HR policies and practices do take care of knowledge requirements.

Is succession planning knowledge-focused?
A. Partly. We may need to enhance our succession planning processes to ensure that there is enough groundwork to identify people with certain potential skills and attach them to senior employees with similar but more experienced profiles.

The questions and answers above expose the problems and thereby set objectives related to improving the system to eliminate these problems. The answers to these questions are obtainable through brainstorming amongst the senior people in the organization that will lead to detailed problem-statements and identification of parameters and how much they need to improve.

The foregoing answers suggest that the organization needs to re-define its induction process, project planning process, project closure process and training process in order to improve operational efficiency and reduce the on-board time for new employees. The four processes identified are analyzed from the knowledge management perspective so as to manage knowledge flow through these processes. The affected sub-systems of the existing KM system (if exist in the first instance) include the Intranet, e-learning modules, personal learning tools and virtual workspaces. Accordingly, the goals for the business-aligned KM system, which is a new KM system or based on an existing KM if one already exists, include:

Reduce project planning cycle time to an average of one week from the current average of two weeks within six months.

Reduce the on-board time for new employees from the current average of three months to one month within a year.

In addition to these high-level statements (business objectives that may be considered as operational goals, the Define step also involves formulating overall KM vision and strategy by top management and KM team (i.e. KM champions) in order to guide the KM execution team. The KM execution team includes individuals who have an understanding of the business, KM practices, processes and technology associated therewith. This execution team is identified in the next step of the KM implementation guide 300.

The third step, Execute, is concerned with translating the outputs from the first two steps into tangible activities that would address the business objectives and overcome the business challenges. To facilitate these activities, a KM execution team is established. Typically, this team includes the KM team, business process experts, HR experts, technology consultants and a KM specialist. The execution team is given the responsibility for drawing up a plan for executing the KM vision and plan (i.e. strategy) as identified and defined in the first two steps.

The Execute step comes to an end with the implementation of the identified processes and systems. In the context of this example, the following activities and outputs from this Execute step can be expected:

A KM plan that concerns itself with the study and improvement of the induction process, project planning process, project closure process and training process by the execution team.

An associated plan that takes care of the fundamentals (i.e. the foundation 240) as depicted in the framework 200 (FIG. 2).

Using the execution toolkit 400 to find solutions to the business challenges. In this case, a combination of the explicit knowledge capture and tacit knowledge dissemination aspects of the execution toolkit 400 are used. Thus, possible solutions include: Documentation on associated explicit knowledge, Exit Interviews, Knowledge Maps, Blogging, After-Action Review, Learning Systems, Experts Locators, Communities, Mentoring, Peer Assists, Knowledge Fairs, Virtual Workspaces and the like. Aspects of these solutions can be altered to suit different needs of the different divisions of the organization.

A plan that explains the roles and responsibilities of the newly introduced processes and systems like mentoring, succession planning, e-learning modules, and the like and their associated governances.

A pilot project carried out in a particular business unit or division of the organization. A suitable business unit in this example would be one that has many new employees joining the business unit.

The fourth step, Assess, is concerned with the measurements of the parameters to gauge improvements. The measurements of the parameters takes place after a period of time has lapsed after the completion of the Execute step. In the context of this example, the Assess step activities may include the followings:

The measurement of the time taken to prepare project plans three months after the execution of the KM vision and strategy to assess progress and predict if the target set in the Define step is likely to be achieved at the end of six months (i.e. an intermediate assessment step to ensure adequate progress).

Time taken for new employees to start work with minimal help from existing employees (i.e. on-board time) to be measured three months after the execution of the KM vision and strategy and continued to be monitored to evaluate if the on-board time reduces from the pre-implementation three months to post-implementation one month within a one year period.

Carry out surveys to capture employees' qualitative feedback on the KM initiative and how they perceive it to be benefiting them in the areas identified (i.e. the business challenges). The surveys may contain generic questions as well as questions specific the induction, project planning, closure and training processes.

The Assess step is performed over a period of time to allow for regular measurements to be taken at pre-determined intervals until a clear indication is obtain as to whether the business-aligned KM system (i.e. pilot KM project) is going to achieve the desired end results. Further, this Assess step is also concerned with appropriate course corrections, when required as determined by the execution team, without having to abandon the project and re-start the same from the Identify step. The execution team in coordination with users of the newly defined KM system (or enhanced version of an existing system) needs to take appropriate steps to change the direction or increase efforts in order to achieve the set targets. For example, in this case, it may be that the development of training material has to be accelerated and completed in a shorter time than originally planned.

The fifth step, Sustain, concerns with maintaining and enhancing the newly created business-aligned KM system. The oversight of the business-aligned KM system is transferred from the execution team to the KM team (i.e. KM specialists, champions, enthusiastic business representatives). The KM team would establish activities that lead to continuous improvement and replication of the business-aligned KM system to cover other business units within the organization.

The Sustain step also concerns with the development of training and awareness programs, embedding artifacts in processes, creation of checklists and merging responsibilities with other functions. For instance, experts need to start documenting their experiences and sharing them rather than wait for a KM champion to further the cause. Further, rules governing the existence and utilization of the business-aligned KM system need to be clearly established and communicated to all employees within the organization. In the context of this example, outputs can be expected from this step include:

Induction and training processes that become a melting pot of knowledge.

A KM-aware organization that makes knowledge sharing and collaboration a way of life.

Regularly sharing success stories and best practices relating to on-board and project planning from divisions that take part in the business-aligned KM system creation process.

Realizing the need to include KM team and representatives from all functions and business units in business decisions.

Figure 5:
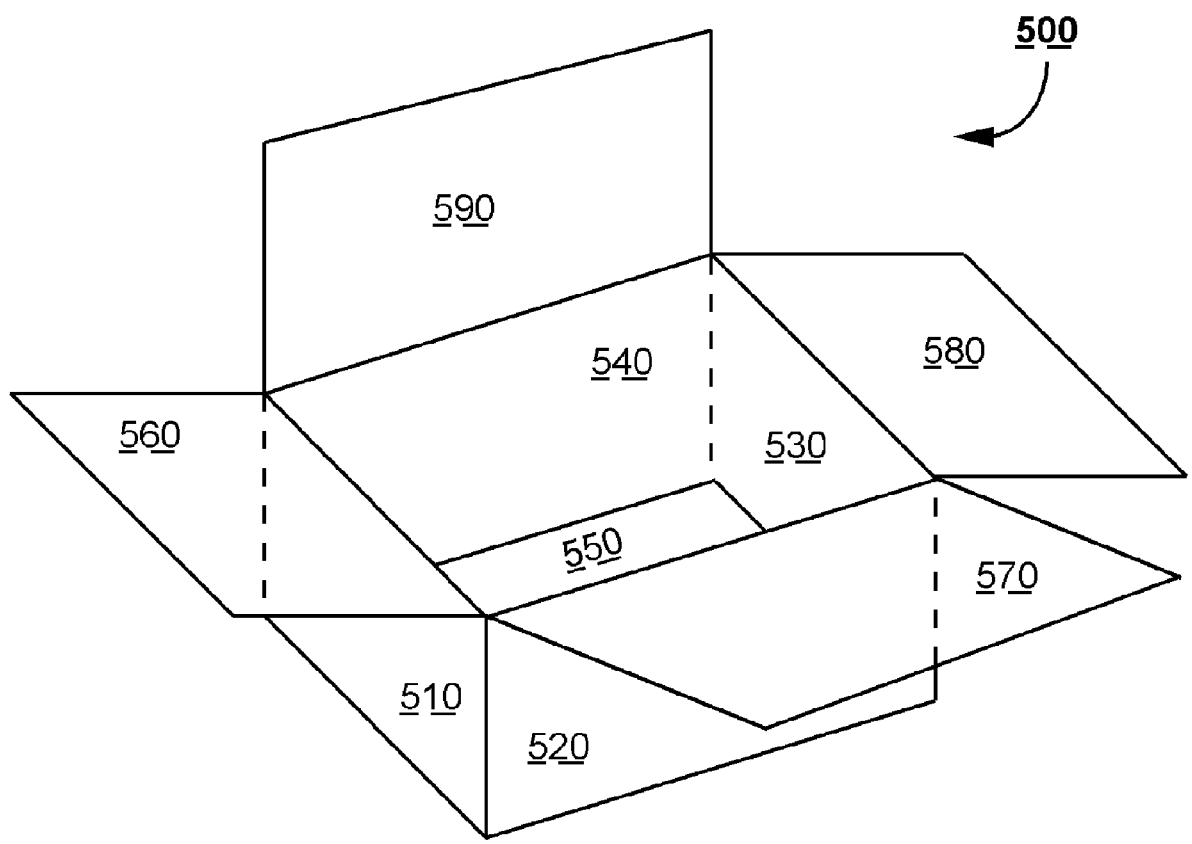
FIG. 5 shows an apparatus encapsulating the KM execution toolkit of FIG. 4 according to an embodiment of the present invention.

In an embodiment, as shown in FIG. 5, an apparatus 500 encapsulating the execution toolkit 400 described in the foregoing can be provided to facilitate effective and rapid KM implementation decisions through knowledge capture, dissemination and utilization. The apparatus 500 is a box having four sides 510, 520, 530, 540 and a base 550. The box is enclosed by four flaps 560, 570, 580, 590, which form a cover of the box.

Typically, it is suggested that the users of the apparatus 500 run through the various queries printed on the outer surfaces of the box and choose most important/relevant queries the answers to which are needed by the organization. Once these queries are identified, the inner surfaces of the box point to the corresponding practices, processes and tools that can be used to tackle the challenges that are associated with the queries. The identified practices, processes and tools can be used as possible solutions in the implementation of the pilot KM projects.

In an embodiment, each flap has queries associated with one of the four concepts of knowledge management: Explicit Knowledge Capture, Explicit Knowledge Dissemination, Tacit Knowledge Capture and Tacit Knowledge Dissemination. On the outer surface of flap 560 is printed with guiding questions relating to tacit knowledge dissemination:

Does the organizational culture emphasize on trust, win-win and excellence (& innovation) through collaboration?

Are like-minded people or people with similar interests able to locate and work with each other?

How fast is the organization learning?

Do people make time for mentoring and thinking and learning together?

Does the organization know who needs whom?

Are roles defined based on knowledge-needs? Is succession planning knowledge-focused?

Does the organization understand its knowledge requirements to a significant level of detail?

Is explicit knowledge captured under-utilized?

The outer surface of flap 570 is printed with guiding questions relating to explicit knowledge capture:

Do we know what we know?

Are our practices, structure, processes, and systems well-known and easily accessible?

Do we look toward the past and capture our learnings?

Do we know who's who?

Are we able to recognize patterns in our business?

Do new employees get into the groove quickly?

Does our workflow consider knowledge needs?

Do we have processes and tools to manage our knowledge artifacts on a continuous basis?

The outer surface of flap 580 is printed with guiding questions relating to tacit knowledge capture:

Do our people policies and practices emphasize on learning, sharing and teaching?

Does the organization spare the time to stop, think and learn?

Is it easy to find and access people (e.g. experts)?

Does the organization have listening and questioning habits embedded in its culture?

Is "Retiring Workforce" a serious challenge?

Does the organization operate primarily in the area of consulting and knowledge-intensive services?

The outer surface of flap 590 is printed with guiding questions relating to explicit knowledge dissemination:

Do our systems work together? Are they integrated?

Do we find ourselves reinventing the wheel?

Do we use the knowledge that we capture? Do we leverage on technology to retrieve and access knowledge?

Does the organization get together and learn? Does the organization work together—sharing and collaborating?

Are there sharing mechanisms in all our knowledge-intensive processes?

Does the workflow consider knowledge needs?

How easy is it to find and utilize information?

Is there consistency in the performance of functions across the organization?

Once the KM vision and plan of the organization is articulated, the apparatus 500 can be used to help with identifying possible solutions to achieve the KM vision. This is achieved by first going through the guiding questions printed on each of the outer flaps 560, 570, 580, 590 and identify those critical questions that remind the user of the challenges that are to be tackled by the KM initiative. Once the critical questions, the answers to which the KM initiative is expected to deliver answers to, are identified, it is but a small activity to understand which categories (i.e. tacit knowledge capture or dissemination or explicity knowledge capture or dissemination) belong to. The identified critical questions may belong to one, two, three or all four categories. For each question identified, the corresponding inner flaps of 560, 570, 580 and 590 are printed with possible solutions in the form of practices and processes. Further, the inner sides of 510, 520, 530 and 540 also provide additional tips on what can be the possible tools that can be employed to provide the desired solutions.

The inner flap of 560 and inner side of 510 provide details on the practices, techniques and tools for Tacit Knowledge Dissemination related challenges. These can include items 440, 442, 444, 446 and 448 described in the foregoing and as shown in FIG. 4. The inner flap of 580 and inner side of 530 provide details on the practices, techniques and tools for Tacit Knowledge Capture related challenges. These can include items 430, 432, 434 and 436 described in the foregoing and as shown in FIG. 4. The inner flap of 570 and inner side of 520 provide details for tackling challenges related to Explicit Knowledge Capture. These can include items 410, 412 and 414 described in the foregoing and as shown in FIG. 4. The inner flap of 590 and inner side of 540 provide details for tackling the challenges related to the Explicit Dissemination of Knowledge. These can include items 420, 422 and 424 described in the foregoing and as shown in FIG. 4.

The inner base 550 of the apparatus 500 is printed with details relating to generic techniques and tools that can be used in implementing the KM solutions. These can include single-window knowledge portals with search facilities and knowledge databases/banks and knowledge channels. The outer side of the base 550 is printed with details relating to the overall goals of the KM initiative, namely, business effectiveness and efficiency, serendipity and innovation, and stakeholders (including employees and customers).

Figure 6:
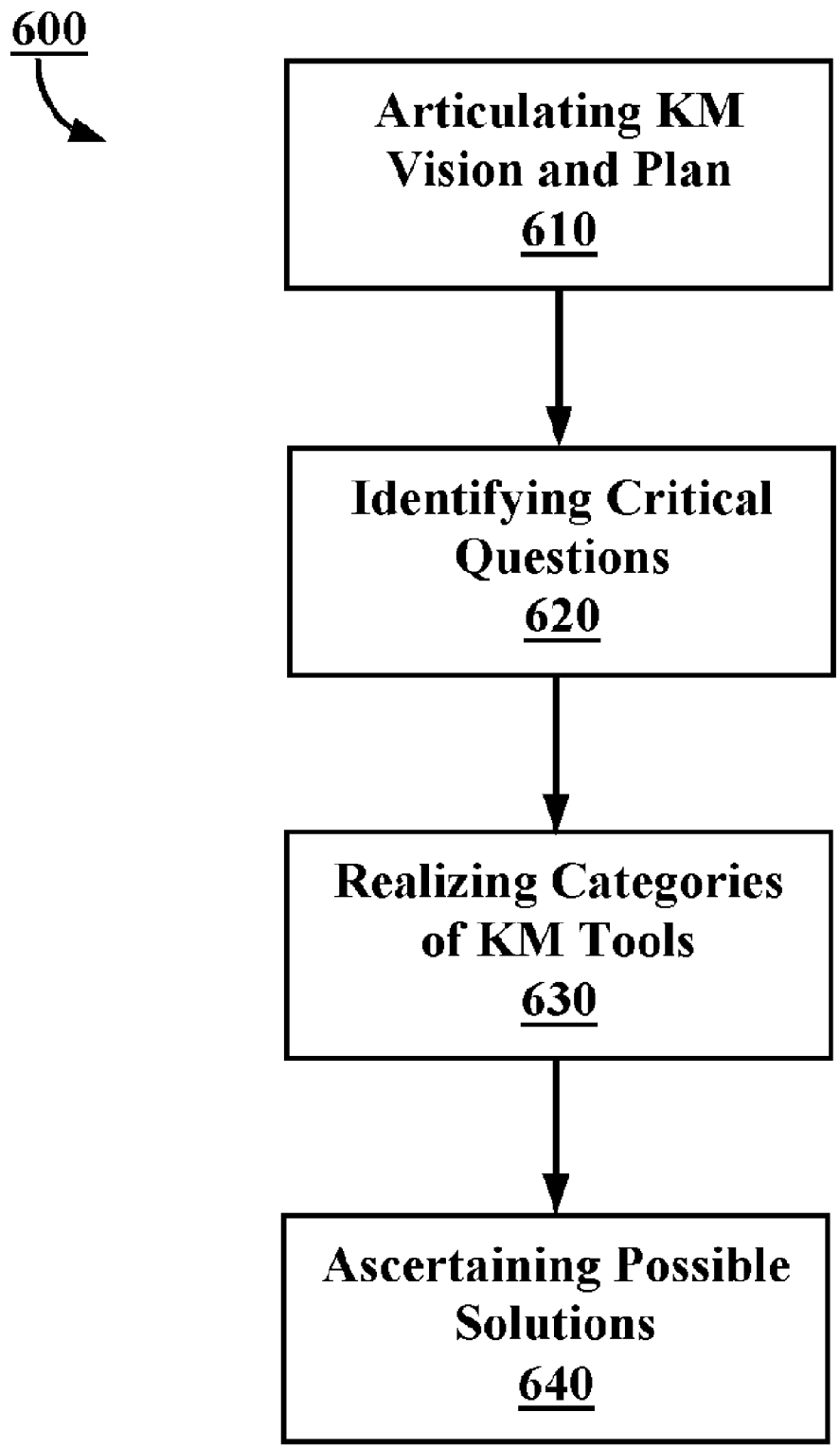
FIG. 6 shows a flowchart for using the apparatus of FIG. 5 according to an embodiment of the present invention.

FIG. 6 shows a flowchart 600 identifying steps for using the apparatus 500. In step 610, the KM vision and plan are articulated. Based on the KM vision and plan, critical queries are identified in step 620. This is simply achieved by going through the leading queries printed on the outer flaps of 560, 570, 580 and 590 and selecting two to three key queries to which the answers would lead to possible solutions.

Appropriate categories of KM are identified from the selected key queries in step 630. These categories can be one, two, three or all of the four possible categories, namely, tacit knowledge capture or dissemination and explicit knowledge capture or dissemination. Based on these categories and the selected queries, possible solutions can be obtained in step 640 by simply referring to the corresponding solutions printed in the inner flaps of 560, 570, 580 and 590 and inner sides of 510, 520, 530 and 540 of the apparatus 500. In the foregoing example of getting new employees on-board, the solutions pointed out by the apparatus 500 can include learning systems, communities, blogging and mentoring.

While the present invention has been described in detail with respect to specific embodiments and examples thereof, it will be appreciated that those skilled in the art, upon attaining an understanding of the foregoing may readily adapt the same for alterations to, variations of, and equivalents to such embodiments. Accordingly, the scope of the present disclosure is not to be limited to the details given herein, but may be modified within the scope and equivalents of the appended claims.

The invention claimed is:

1. A system for creating a business-aligned knowledge management in an organization, the system comprising:
    a knowledge management (KM) framework block providing aspects of a knowledge-focused approach to business management of the organization;
    a KM execution toolkit comprising a knowledge capturing tool, a knowledge dissemination tool and knowledge channels, processes and practices associated with each of the tool within the KM framework, wherein the knowledge capturing tool comprises tools for capturing explicit and tacit knowledge; and the knowledge dissemination tool comprises tools for disseminating explicit and tacit knowledge; and
    a KM implementation guide using the KM execution toolkit for establishing the business-aligned knowledge management within the KM framework, wherein the KM implementation guide performs the steps of:
    identifying a business objective of the organization;
    defining a knowledge management strategy for addressing the business objective, wherein defining the knowledge management strategy comprises articulating problem statements based on the business objective and establishing knowledge management vision and plan for addressing the problem statements; and
    executing the knowledge management strategy to establish the business-aligned knowledge management, wherein executing the knowledge management strategy comprises using the KM execution toolkit to
        identify types of knowledge to address the problem statements, wherein the types of knowledge are explicit knowledge and tacit knowledge;
        ascertain tools and knowledge channels, processes and practices associated with the tools from the KM execution toolkit to address the identified types of knowledge, wherein each tool comprises respective guiding questions relating to at least one of knowledge, processes, or technology enablers to address the problem statements; and
        implement the ascertained tools and knowledge channels, processes and practices associated with tools in the business-aligned knowledge management to address the problem statements.

2. The system of claim 1, wherein the aspects of the knowledge-focused approach comprise business-aligned knowledge objectives; knowledge functions; knowledge channels; and fundamental resources.

3. The system of claim 2, wherein the knowledge functions comprise at least one of knowledge capture; knowledge dissemination; knowledge classification and storage; knowledge retrieval; knowledge re-use; knowledge application; or knowledge creation.

4. The system of claim 2, wherein the knowledge channels comprise at least one of information portals; repositories; workspaces; communities; experts locators; databanks; or intelligent agents.

5. The system of claim 2, wherein the fundamental resources comprise at least one of KM champions; KM policies and procedures; HR practices; or KM culture.

6. The system of claim 2, wherein the aspects further comprising benefits and measures, the benefits and measures being at least one of shareholder value; customer satisfaction and retention; innovations; operating efficiency; or employee learning, satisfaction and retention.

7. The system of claim 1, wherein defining the knowledge management strategy further comprising specifying parameters and measurements for evaluating the success of the knowledge management strategy.

8. The system of claim 1 further comprising assessing the success of the business-aligned KM system upon the completion of executing the knowledge management strategy.

9. The system of claim 1 further comprising: assessing the success of the business-aligned KM system upon a lapsed time after the completion of executing the knowledge management strategy.

10. The system of claim 1 further comprising: sustaining the business-aligned KM system.

11. The system of claim 10, wherein sustaining the business-aligned KM system comprises observing and tracking the performance of the business-aligned KM system against the business objective and making appropriate modifications thereto and creating suitable automating tools.

12. The system of claim 1, wherein the knowledge channels comprise at least one of experts locators; learning systems; communities; workspaces; knowledge portals; databanks; blogs; emails; or help desks.

13. The system of claim 1, wherein the processes and practices associating with the tools comprise at least one of documentation; recording skills; blogging; after-action review; exit interview; knowledge maps; knowledge audits; data mining; business intelligence; knowledge sharing; coaching; collaboration; lessons learnt; mentoring; networking, storytelling, peer assist; or knowledge fairs.

14. A method of creating a business-aligned knowledge management system for an organization, the method comprising:
    providing a knowledge management (KM) framework specifying aspects of a knowledge-focused approach to business management of the organization; and
    implementing the KM framework in the business management of the organization to create a business-aligned knowledge management system, wherein implementing the KM framework comprises using a KM implementation guide and a KM execution tool kit to create the business-aligned knowledge management system, and wherein the KM execution toolkit comprises tools for capturing explicit and tacit knowledge, tools for disseminating explicit and tacit knowledge and knowledge channels, processes and practices associated with each of the tools, and wherein the KM implementation guide comprises steps of:
    identifying a business objective of the organization;
    defining a knowledge management strategy for addressing the business objective, wherein defining the knowledge management strategy comprises articulating problem statements based on the business objective and establishing knowledge management vision and plan for addressing the problem statements; and executing the knowledge management strategy to create the business-aligned knowledge management system, wherein executing the knowledge management strategy comprises using the KM execution toolkit to identify types of knowledge to address the problem statements, wherein the types of knowledge are explicit knowledge and tacit knowledge;

ascertain tools and knowledge channels, processes and practices associated with the tools from the KM execution toolkit to address the identified types of knowledge, wherein each tool comprises respective guiding questions relating to at least one of knowledge, processes, or technology enablers to address the problem statements; and implement the ascertained tools and knowledge channels, processes and practices associated with tools in the business-aligned knowledge management system to address the problem statements.

15. The method of claim 14, wherein the aspects of the knowledge-focused approach comprise business-aligned knowledge objectives; knowledge functions; knowledge channels; and fundamental resources, wherein the knowledge functions comprise at least one of knowledge capture and dissemination; knowledge classification, storage and retrieval; knowledge re-use and application; or knowledge creation; the knowledge channels comprise at least one of information portals; repositories; workspaces; communities; experts locators; databanks; or intelligent agent; and the fundamental resources comprise at least one of KM champions; KM policies and procedures; HR practices; or KM culture.

16. The method of claim 14, wherein defining the knowledge management strategy further comprising specifying parameters and measurements for evaluating the success of the knowledge management strategy.

17. The method of claim 14 further comprising: assessing the success of the business-aligned KM system upon the completion of executing the knowledge management strategy.

18. The method of claim 14 further comprising: sustaining the business-aligned KM system by observing and tracking the performance thereof and making modifications thereto.

19. The method of claim 14, wherein the knowledge channels comprises at least one of experts locators; learning systems; communities; workspaces; knowledge portals; databanks; blogs; emails; or help desks.

20. The method of claim 14, wherein the processes and practices comprises at least one of documentation; recording skills; blogging; after-action review; exit interview; knowledge maps; knowledge audits; data mining; business intelligence; knowledge sharing; coaching; collaboration; lessons learnt; mentoring; networking, storytelling, peer assist; or knowledge fairs.

21. An article of manufacture comprising:

a box having inner surfaces and outer surfaces comprising four sides, a base and a cover; wherein the cover being divided into four portions with each portion having guiding questions disposed on the outer surface and solutions to the guiding questions disposed on the inner surface thereof, the first portion being related to tacit knowledge capturing, the second portion being related to tacit knowledge dissemination, the third portion being related to explicit knowledge capturing and the fourth portion being related to explicit knowledge dissemination; the inner surface of the four sides having practices associating with the corresponding solutions to the guiding questions disposed thereon; and the inner surface of the base having techniques and tools relating to knowledge channels disposed thereon.

22. The article of claim 21, wherein the practices associating with:

tacit knowledge capturing comprises at least one of listening; questioning; lessons learnt; blogging; emails; or help desks;

tacit knowledge dissemination comprises at least one of mentoring; networking; storytelling; peer assist; or knowledge fairs;

explicit knowledge capturing comprises at least one of documentation; recording skills; knowledge maps; knowledge audits; data mining; business intelligence; after-action review; or blogging; and explicit knowledge dissemination comprises at least one of knowledge sharing; coaching; collaboration; or mentoring.

23. The article of claim 21, wherein the knowledge channels comprise at least one of information/knowledge portals; repositories; workspaces; communities; experts locators; databanks; or intelligent agents.

24. A method of using the article according to anyone of claims 21, 22, or 23, the method comprising:

articulating a KM vision and plan;

identifying questions critical to the KM vision and plan from the outer surface of the cover; and ascertaining possible solutions, practices and tools to the questions from the inner surface of the box.

* * * * *